United States Patent [19]
Kobayashi et al.

[11] Patent Number: 6,103,288
[45] Date of Patent: Aug. 15, 2000

[54] METHOD AND APPARATUS FOR CUTTING A LYING BAR-SHAPED FOOD

[75] Inventors: Masao Kobayashi; Hironori Kobayashi, both of Fukui, Japan

[73] Assignee: Kobird Co., Ltd., Fukui, Japan

[21] Appl. No.: 09/341,521

[22] PCT Filed: Mar. 12, 1999

[86] PCT No.: PCT/JP99/01206

§ 371 Date: Jul. 13, 1999

§ 102(e) Date: Jul. 13, 1999

[87] PCT Pub. No.: WO99/46996

PCT Pub. Date: Sep. 23, 1999

[30] Foreign Application Priority Data

Mar. 19, 1998 [JP] Japan .................................. 10-070982

[51] Int. Cl.[7] .............................. A21C 5/00; A21D 8/00
[52] U.S. Cl. .......................... 426/503; 83/932; 425/308; 425/316; 426/518

[58] Field of Search ................................. 426/503, 518, 426/496; 425/308, 316, 298; 83/932; 264/157

[56] References Cited

U.S. PATENT DOCUMENTS

| 4,647,468 | 3/1987 | Pinto ........................................ 426/503 |
| 5,286,185 | 2/1994 | Tashiro et al. ........................... 426/503 |

FOREIGN PATENT DOCUMENTS 6-217675  8/1994  Japan .

*Primary Examiner*—George C. Yeung
*Attorney, Agent, or Firm*—Snider & Associates; Ronald R. Snider

[57] ABSTRACT

Cutting operation is performed on a bar-shaped food (F) which is delivered to the shutter mechanism (1) with laid on a take-in conveyor (2), a required portion of said food being cut at the shutter with its lying position intact while supported by said take-in conveyor (2) and a take-out conveyor (3) disposed as opposed to the former.

10 Claims, 14 Drawing Sheets

METHOD AND APPARATUS FOR CUTTING A LYING BAR-SHAPED FOOD

BACKGROUND OF THE INVENTION

1. Field of the Invention

The present invention relates to a method for cutting a lying bar-shaped food and the same apparatus, in more detail, relating to such method and apparatus that a predetermined portion of a bar-shaped food lying on a carriage conveyor can be cut with that lying position intact.

2. Prior Art

To date, the present applicant has developed such method and apparatus for continuously producing in automation a cored lump food whose inner food material of a certain kind is coated with an outer skin material of a different kind such as a pounded rice cake or bun with sweet bean paste stuffed therein and cheeseburger, and filed a patent application such as Japanese "Kokai" or Laid-open Patent Application No. 6-217675 therefor. The arrangement of such prior art is that to produce a cored lump food, a multilayered bar-shaped food which is extruded with more than two kinds of food materials concentrically overlaid on one another is introduced into a cutting area of a shutter mechanism enclosed with a plurality of cutter pieces which open and close around said area and a certain portion of the food is circumferentially squeezed and cut by simultaneously operating the respective cutter pieces so as to close said cutting area. This has greatly improved the efficiency of producing a cored lump food.

However, with such prior method and apparatus as mentioned above, it has been found inconvenient in use when a soft food material is processed because a bar-shaped food extruded from a nozzle is vertically extruded downwards and is performed cutting operation by the shutter mechanism disposed below the nozzle so that the food is elongated or torn off during the extrusion due to its self-weight, with the result that a normal cutting operation can not be performed.

SUMMARY OF THE INVENTION

Thus, the present invention is to provide a method and apparatus for cutting a lying bar-shaped food of any kinds to enable a required portion of the food to be cut without being elongated or torn off.

The present invention is also to provide such method and apparatus to enable a bar-shaped food to be efficiently cut without being elongated or torn off while the food is continuously conveyed without intermission.

Further, the present invention is to provide such method and apparatus for forming a bar-shaped food without affecting the sticky and elastic nature of bread dough and the like due to its glutinous substance and cutting a required portion of such food, which can resolve such processing troubles as mentioned above.

To solve the above issue, the present invention adopts a method for cutting a lying bar-shaped food wherein the bar-shaped food (F) is introduced into a cutting area (10) of a shutter mechanism (1) enclosed with a plurality of cutter pieces (C) which simultaneously open and close around said area and a predetermined portion of said food (F) is cut by closing said area, said method comprising the steps of transferring at least a tip end portion of said food (F) from a downstream end portion (D) of a take-in conveyor (2) to an upstream end portion (U) of a take-out conveyor (3) by delivering said food towards said cutting area (10) with said food mounted on the take-in conveyor (2) while inserting the downstream end portion (D) into the area (10) in an open position so that it approaches to said end portion (U) of the take-out conveyor (3) and retreating the downstream end portion (D) from the area (10) by retracting the downstream end portion (D) with the tip end portion of the food (F) mounted on the take-out conveyor (3), and cutting a predetermined portion of the food (F) by closing the area by means of the operation of the cutter pieces (C) so as to form a cut food (G), said cut food (G) being issued out by said take-out conveyor (3).

Moreover, to solve the above issue, the present invention adopts an apparatus for cutting a lying bar-shaped food wherein the bar-shaped food (F) is introduced into a cutting area (10) of a shutter mechanism (1) enclosed with a plurality of cutter pieces (C) which simultaneously open and close around said area and a predetermined portion of said food (F) is cut by closing said area (10), said apparatus comprising a take-in conveyor (2) disposed in the vicinity of the cutting area (10), said conveyor (2) delivering the food (F) towards the cutting area (10) with the food mounted thereon while reciprocally moving back and forth between an advance position where a downstream end portion (D) of the conveyor (2) is inserted into said area in an open position and a retract position where said end portion (D) is retreated from said area (10) and a take-out conveyor (3) disposed in the vicinity of the cutting area (10) and as opposed to said conveyor (2), said conveyor (3) receiving a tip end portion of the food (F) from the downstream end portion (D) of the conveyor (2) in an advance position where said end portion (D) is inserted into the area (10) and issuing out a cut food (G) formed by the closing operation of the area (10).

Where appropriate, the present invention also adopts such an additional means as a side winder (8) disposed on the upstream side of the take-in conveyor (2), said winder continuously forming a bar-shaped food (F) by winding up a sheetlike dough (S) sequentially delivered by a forming conveyor (81) to the cross-machine direction with an inclined roller (82).

DESCRIPTION OF THE PREFERRED EMBODIMENT

Figure 1:
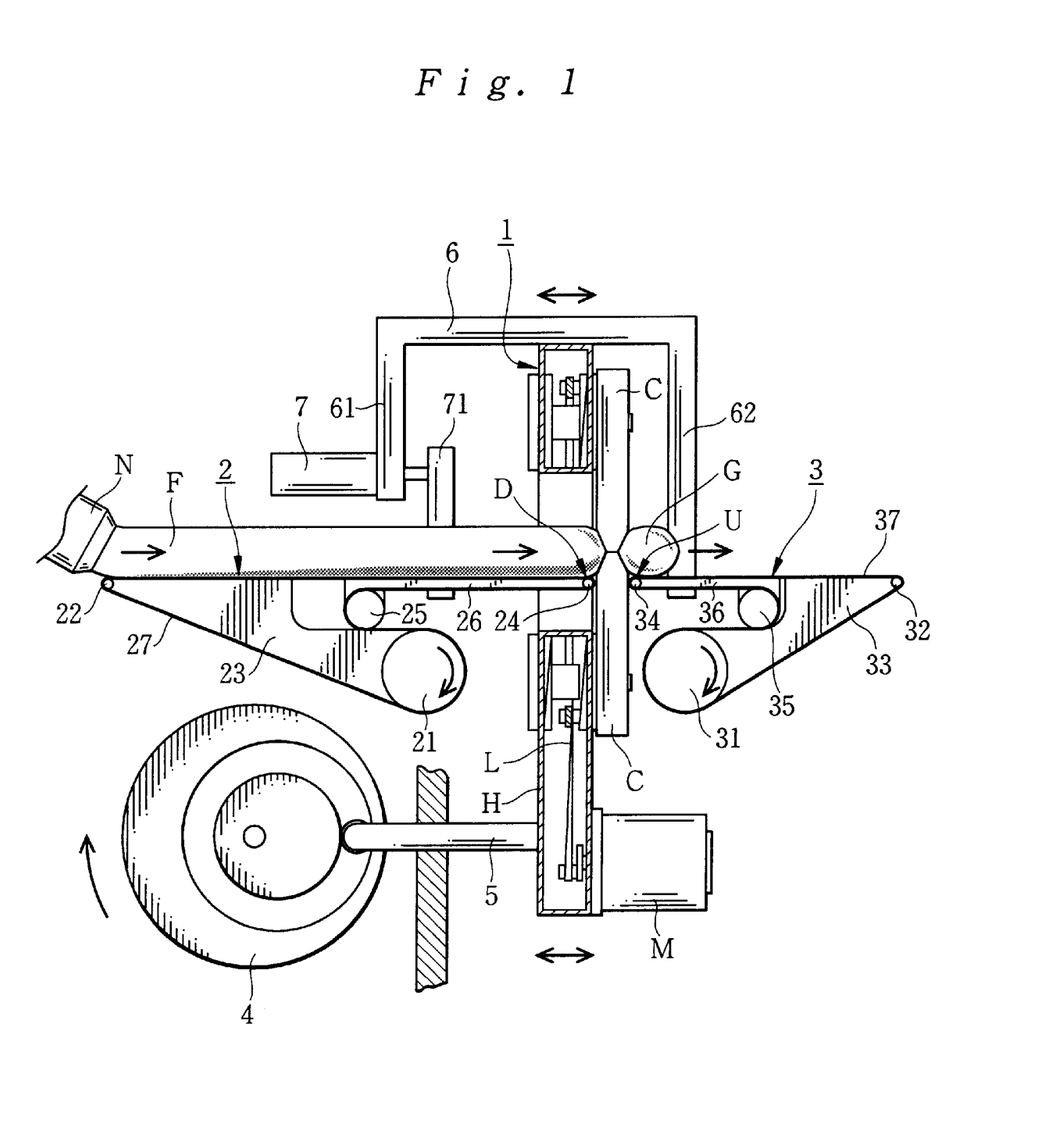
FIG. 1 is a partly frontal view of an apparatus for cutting a lying bar-shaped food embodied in the present invention.

According to the apparatus embodied in the present invention, as shown in FIG. 1, a bar-shaped food (F)

extruded from a nozzle (N) is, with its lying position intact, delivered to a shutter mechanism (1) by a take-in conveyor (2). Then, the food is cut by the shutter mechanism (1) with its lying position intact and supported on both a take-in conveyor (2) and a take-out conveyor (3). Finally, a cut lump food (G) is issued out by the conveyor (3). The respective parts of the apparatus are sequentially explained in detail with reference to FIGS. 1 to 3. The cutting steps of the apparatus are described with reference to FIGS. 4 to 9.

Figure 2:
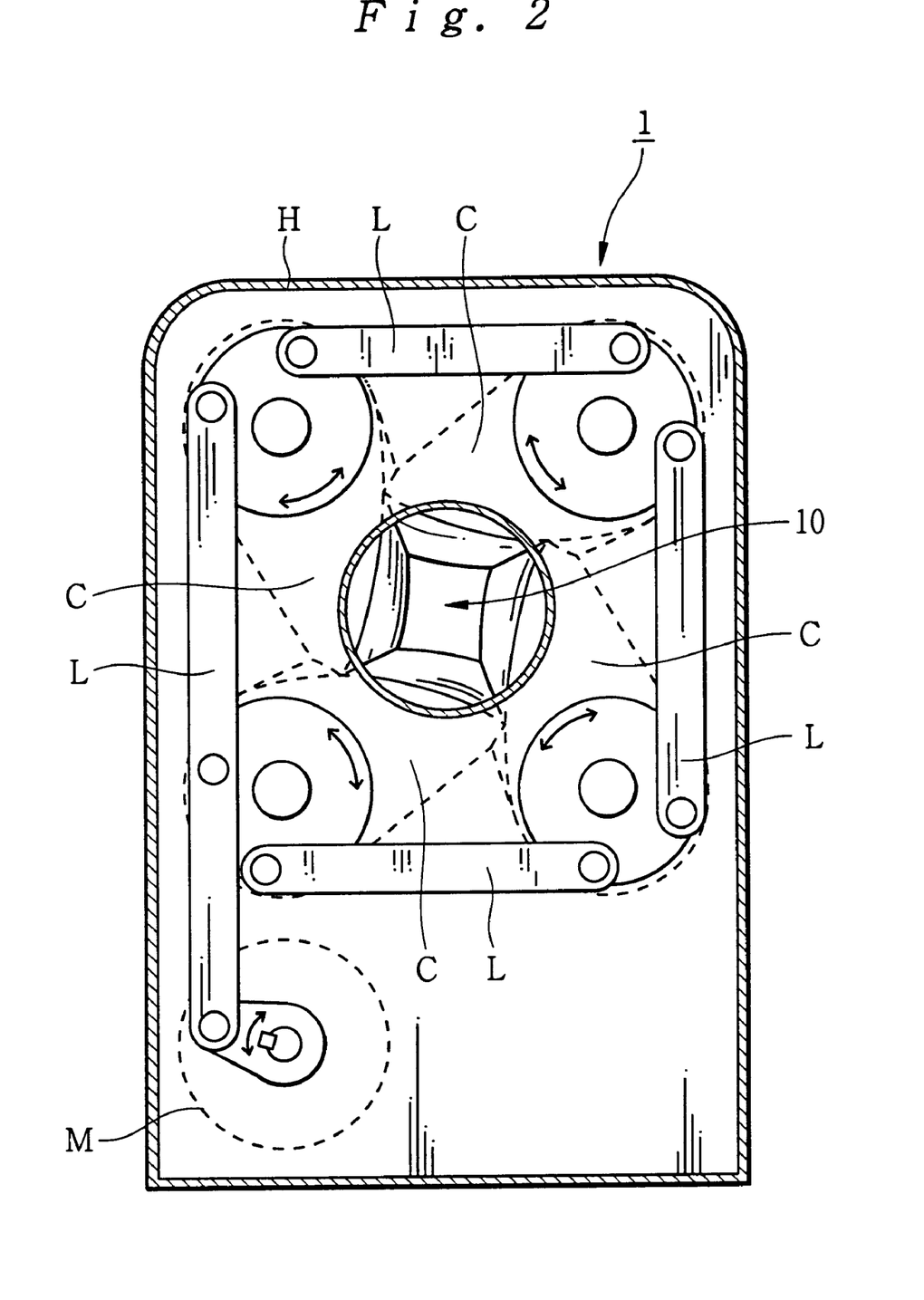
FIG. 2 is a partly sectional view of a shutter mechanism of the apparatus embodied in the present invention.

With the shutter mechanism (1) embodied in the present invention, as shown in FIGS. 1 and 2, four cutter pieces (C) are received in a housing (H) in which they are each disposed by means of radial bearing structure in such a manner that the respective cutter pieces reciprocally rotate. In the center of the shutter disposed in cross-machine direction, a cutting area (10) is formed with said cutter pieces (C) which encloses the circumference of the food to be introduced from a take-in conveyor (2) so as to open and close with regard to said food. This cutting area performs its opening and closing operation by driving the cutter pieces (C), which are interconnected with each other through a linkage mechanism (L), by means of a motor (M) so as to simultaneously and reciprocally rotate, and as shown in FIG. 1, a lying bar-shaped food (F) is cut by completely closing said area.

The shutter mechanism (1) embodied in the present invention, by means of a cam (4) axially supported on the apparatus and a driven rod (5), is arranged so that it reciprocally moves to the delivery direction of the food (F) by synchronizing with the carriage operation thereof. That is to say, this mechanism is arranged so that it can continuously perform its cutting operation without halting the carriage operation of the food (F)(or its extrusion from the nozzle (N)) in such a manner that the whole mechanism (1) moves to the delivery direction of the food (F) in accordance with the delivery speed thereof, when the food (F) is cut at the area (10).

Figure 3:
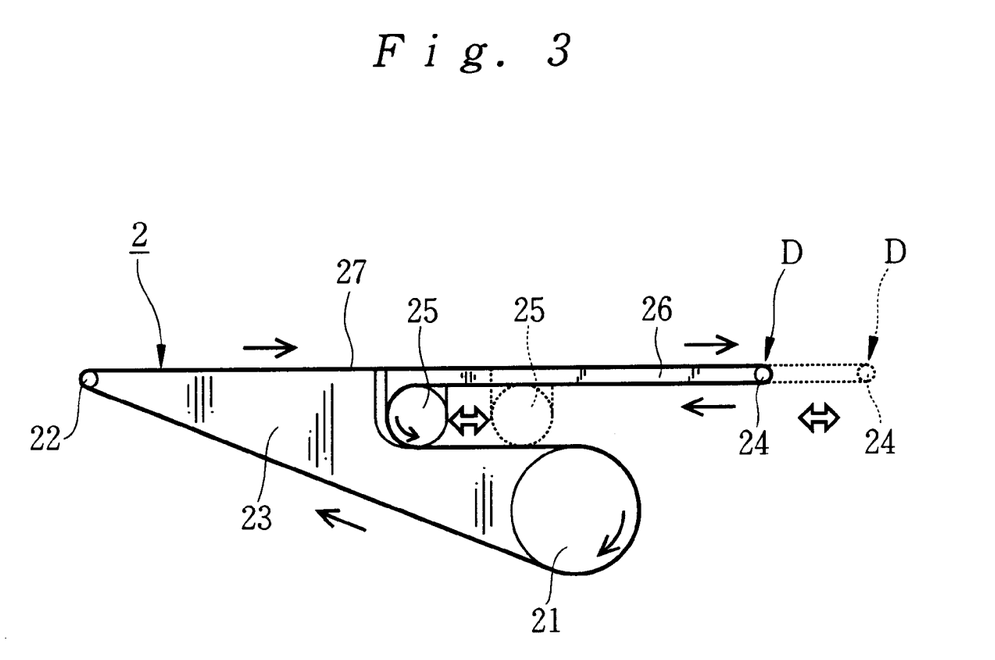
FIG. 3 is a partly frontal view of a take-in conveyor of the apparatus embodied in the present invention.

The take-in conveyor (2) embodied in the present invention, as shown in FIGS. 1 and 3, is disposed in the vicinity of the shutter mechanism (1) and comprises: a frame (23) fixed on the apparatus which axially supports a drive pulley (21) and an upstream end pulley (22) respectively ; a movable table (26) approaching to and moving away from said frame (23) which axially supports a downstream end pulley (24) and an intermediate pulley (25) respectively; and a belt portion (27) wound on said drive pulley (21), upstream end pulley (22), downstream end pulley (24) with the outer side surface thereof facing up and said intermediate pulley (25) with the inner side surface thereof facing up. A lying bar-shaped food (F) mounted on the top surface of the belt is carried into the area (10) at the same speed as the extruding speed of the nozzle by moving the belt (27) from the upstream end pulley (22) to the downstream end pulley (24).

In this embodiment, since the intermediate pulley (25) interposed between the downstream end pulley (24) and the drive pulley (21) is arranged so that it contacts the outer side surface of the belt (27) and holds it in set-back position like a well-known tension roller, as shown in FIG. 3, only the downstream end portion (D) of the conveyor can reciprocally move without changing the belt length or by moving the table (26) simultaneously with the intermediate and downstream end pulleys. Accordingly, during the delivery of the food (F) on the conveyor, the downstream end portion (D) can freely move back and forth separately from the carriage operation thereof, and also the back-and-forth speed of the downstream end portion can be set or altered apart from the delivery speed (or the extruding speed of the food by the nozzle).

The back-and-forth movement of the table (26) which axially supports said downstream end and intermediate pulleys, as shown in FIG. 1, utilizes the contractile characteristics of a pneumatic cylinder (7) connected to the table through a stay (71). This cylinder is fixed on one arm (61) of a supporting member (6) fixed on the upper part of the housing (H) receiving the shutter mechanism (1). When the cylinder (7) pushes forward the stay, the table (26) advances towards the shutter mechanism (1) so that the downstream end portion (D) with the pulley (24) is inserted into the area (10) in an open position (refer to FIGS. 4 and 5) while pushing it back by contraction, the table (26) retreats from the shutter so that the downstream end portion (D) is retracted from the area (10) (refer to FIGS. 6 and 7).

As shown in FIG. 1, the take-out conveyor (3) of the present invention comprises: a frame (33) fixed on the apparatus which axially supports a drive pulley (31) and a downstream end pulley (32) respectively; a movable table (36) approaching to and moving away from said frame (33) which axially supports an upstream end pulley (34) and an intermediate pulley (35) respectively; and a belt portion (37) wound on said drive pulley (31), downstream end pulley (32), upstream end pulley (34) with the outer side surface thereof facing up and said intermediate pulley (35) with the inner side surface thereof facing up. This conveyor (3) is disposed in the vicinity of the shutter mechanism (1) and as opposed to said conveyor (2). A cut lump food (G) mounted on said belt (37) is issued out to a destination by moving the latter from the upstream pulley (34) to the downstream pulley (32) by means of the drive pulley (31).

With the conveyor (3) embodied in the present invention, since an intermediate pulley (35) interposed between an upstream end pulley (34) and a drive pulley (31) is arranged so that it contacts the outer surface of the belt (37) and holds it in set-back position like a tension roller, in the same way as the above-mentioned conveyor (2), only the upstream end portion (U) of the conveyor can reciprocally move without changing the belt length or by moving the table (36) simultaneously with the intermediate and upstream end pulleys. Accordingly, during the food take-out operation, the upstream end portion (U) can freely move back and forth separately from the carriage operation thereof, and also the back-and-forth speed of the upstream end portion can be set or altered apart from the delivery speed of the food.

In this embodiment, the back-and-forth movement of the table (36) which axially supports the pulleys (34) and (35), as shown in FIG. 1, utilizes the reciprocal movement of a driven rod (5) engaged with the cam (4), which is transmitted to said table through the other arm (62) of the supporting member (6) fixed on the upper part of said shutter mechanism (1). Accordingly, the upstream end portion (U) of the conveyor (3) performs the same back-and-forth movement as that of the shutter mechanism (1) by means of the above-mentioned cam (4), so that there is no change in relative position between the upstream end portion (U) of the conveyor (3) and the shutter mechanism (1) through the whole steps of cutting operation.

Hereafter, the cutting steps of the apparatus embodied in the present invention are explained with reference to FIGS. 4 to 9.

Figure 9:
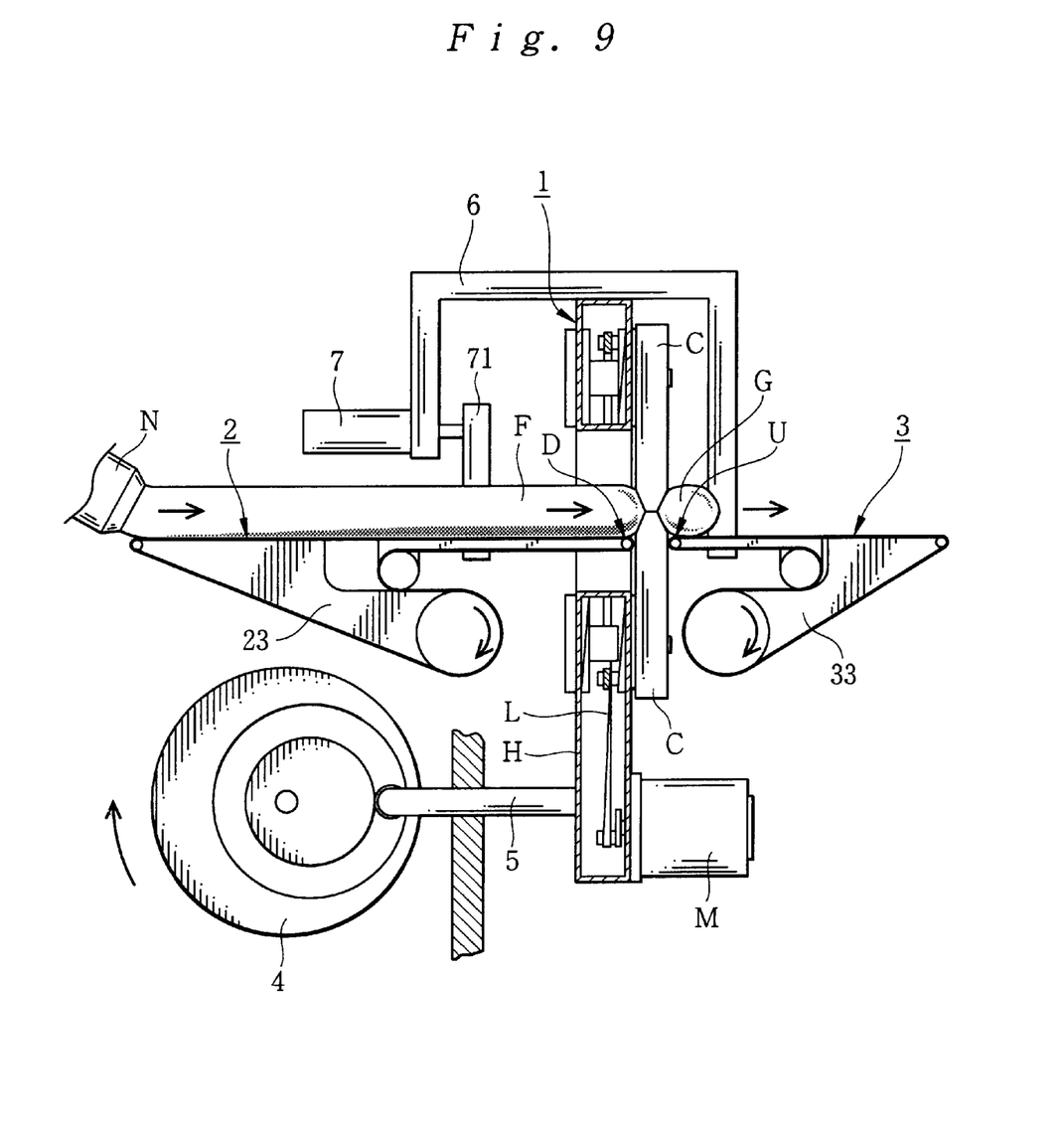

It should be noted that the apparatus embodied in the present invention performs cutting operation on a bar-shaped food (F) through a series of steps as sequentially shown in the order of those drawings. FIG. 9 shows the final step of the operation where the food is cut off. After this step, the operation returns to the first step as shown in FIG. 4 to proceed with the subsequent series thereof.

Figure 4:
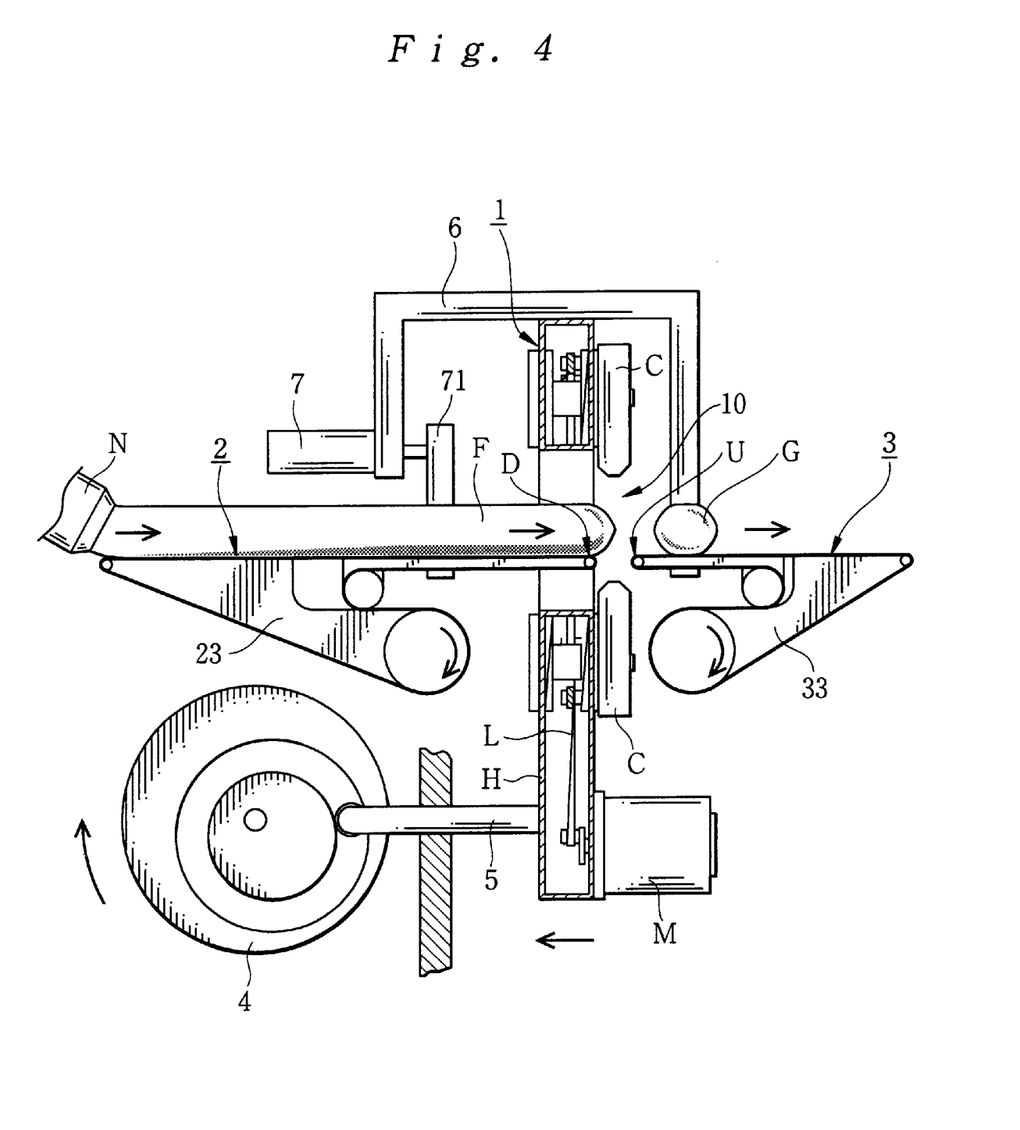
FIGS. 4 to 9 are partly frontal views of the apparatus showing its cutting steps.
Figure 5:
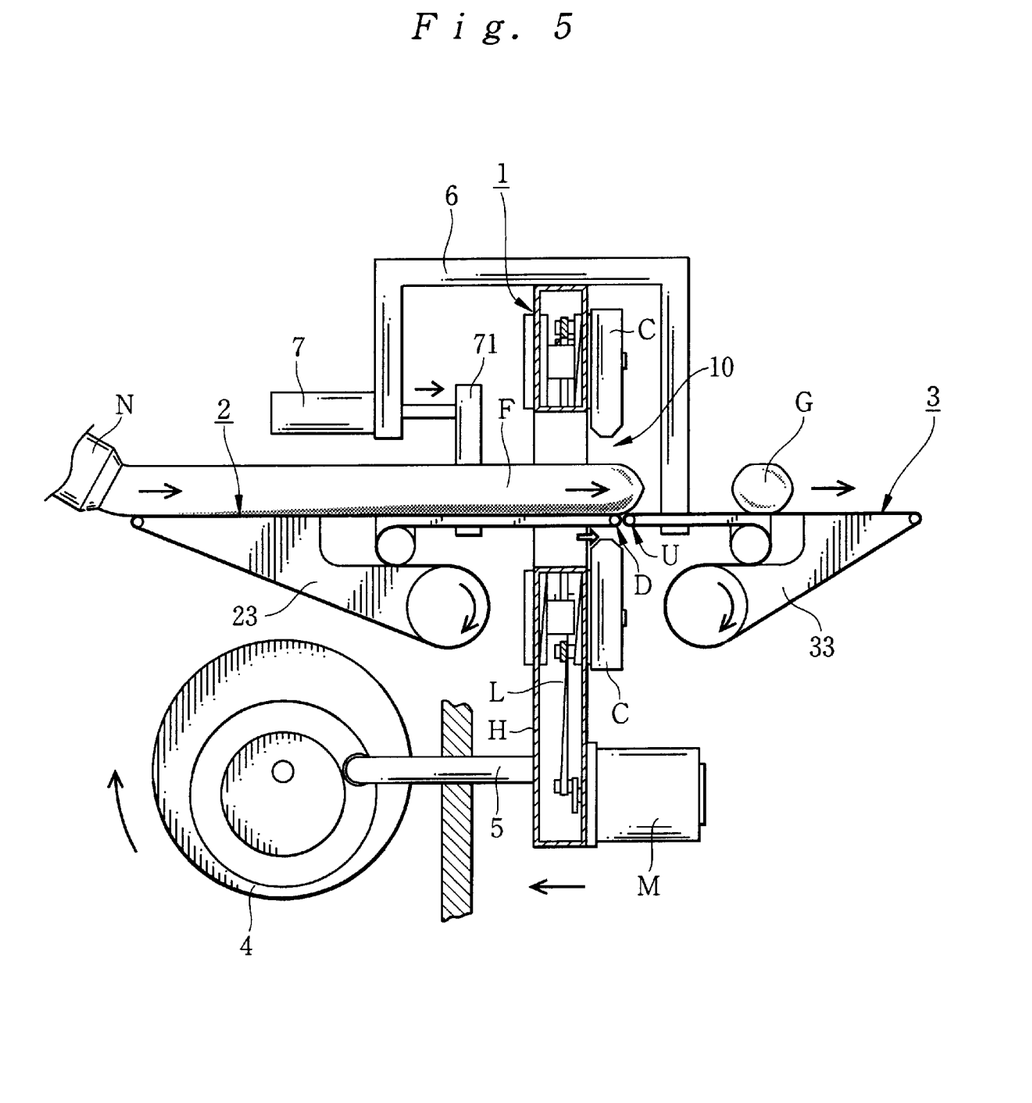

As shown in FIG. 4, the bar-shaped food (F) continuously extruded from the nozzle (N) is mounted on the conveyor (2) and carried towards the cutting area (10) of the shutter mechanism (1) in a lying position. In this way, the food (F) is delivered to the shutter mechanism (1) with laid on the conveyor (2), so that there is no case where the food is elongated or torn off due to its self-weight during the extrusion thereof as in the conventional apparatus of this type.

Figure 6:
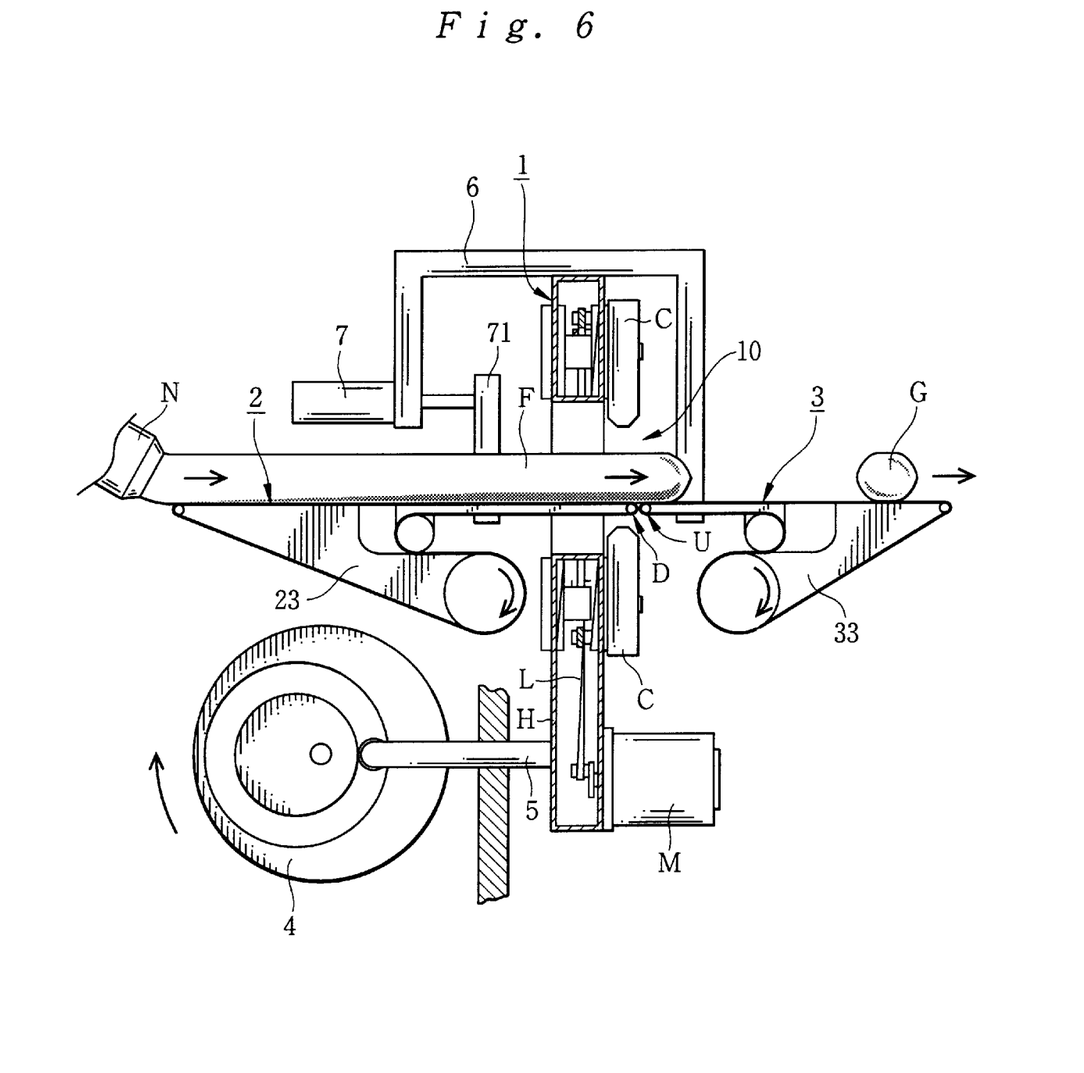

Then, by inserting the downstream end portion (D) of the conveyor (2) into the area (10) in an open position while delivering the food (F) into the area on the conveyor (2) so as to make this end portion approach to the upstream end portion (U) of the conveyor (3) (refer to FIG. 5), the tip end portion of the food (F) lying on the downstream end portion (D) of the conveyor (2) is carried over to the upstream end portion (U) of the take-out conveyor (3) (refer to FIG. 6).

Figure 7:
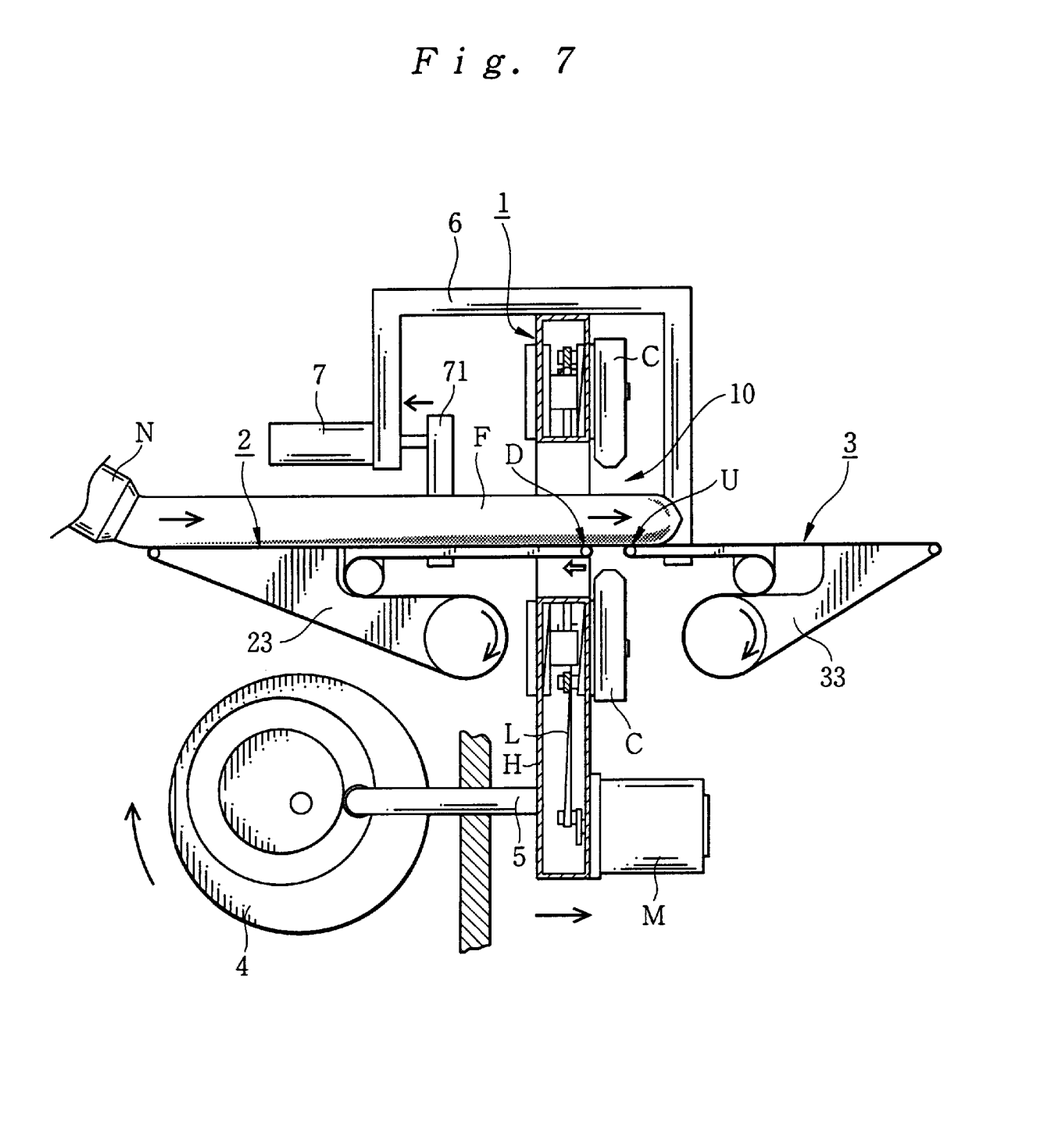

Subsequently, the downstream end portion (D) of the conveyor (2) retreats from the area (10) by retracting said end portion (D) with the tip end portion of the food (F) mounted on the conveyor (3) (refer to FIG. 7). In this embodiment, as mentioned above, said portion (D) can move back and forth separately from the carriage operation by the conveyor, so that there is no case where the belt portion (27) pulls back the food (F), even if said end portion (D) is retracted faster than the delivery speed of the belt portion (27) or the tip end portion of the food drops from the take-out conveyor (3) in the wake of the retraction of said end portion (D).

Figure 8:
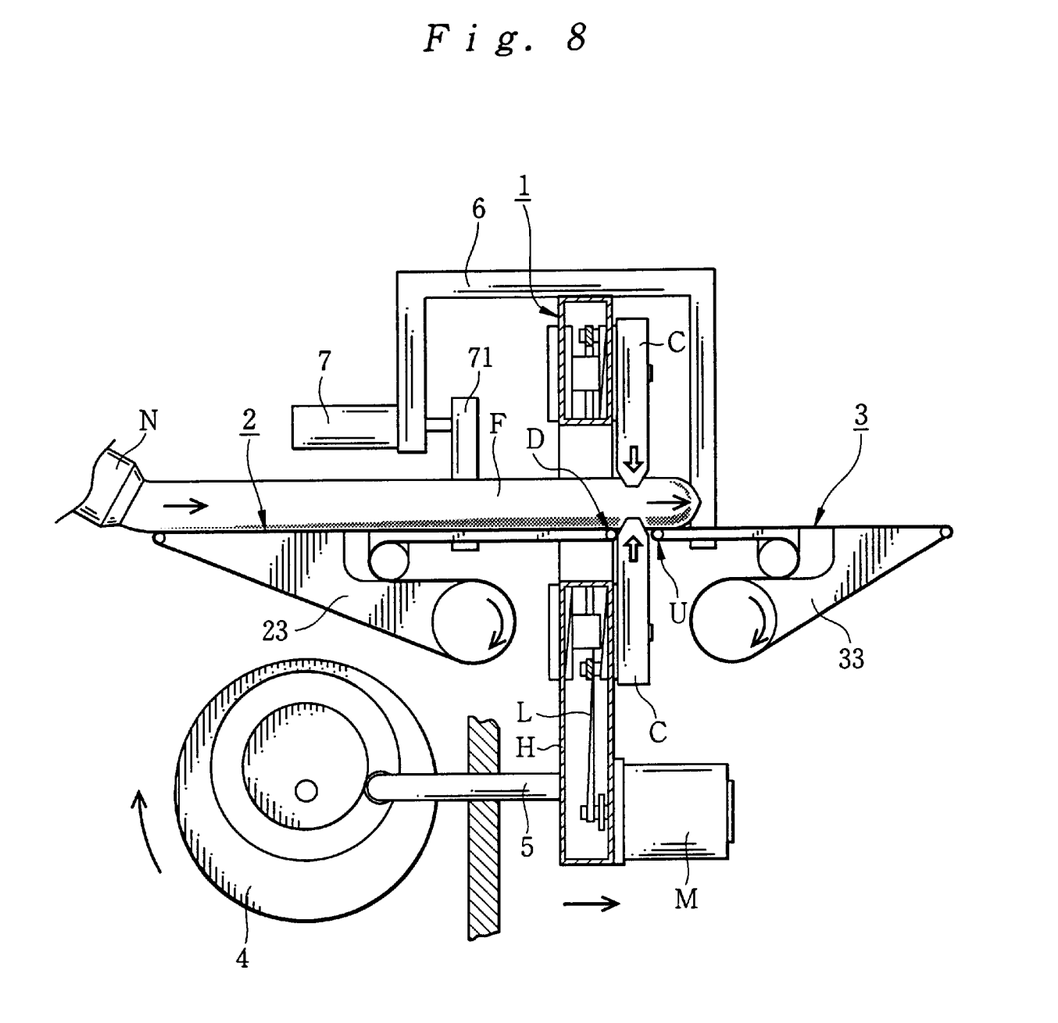

Immediately after said portion (D) has been retracted from the area (10), this area closes by simultaneously rotating the cutter pieces (C) of the shutter mechanism (1) so as to perform cutting operation on the food (F) (refer to FIGS. 8 and 9). Then, as shown in FIG. 4, said area returns to the first opening state as well as the respective components of the apparatus return to the original position thereof, while a cut lump food (G) is issued out by the conveyor (3).

In this embodiment, in order to accurately perform cutting operation on a continuously delivered food at the time of cutting the same at the area (10), the whole shutter mechanism (1) is arranged so that it moves by means of the cam (4) and driven rod (5) towards the delivery direction of the food (F). The opening and closing operation of the area (10) is sequentially performed starting from the step shown in FIG. 7, via those shown in FIGS. 8 and 9, ending at that shown in FIG. 4. During the steps shown in FIGS. 4 through 7, the area is held in open position. The synchronous movement of the shutter mechanism with the carriage of the food on the conveyor is carried out during the steps shown in FIGS. 6 through 9, which recovery to the original position is perfomed during the steps shown in FIGS. 4 through 6.

As one concrete example for working the present invention, the above embodiment has been disclosed above. However, it should be understood that the present invention is not limited to this embodiment, but can be modified in various manners within the scope of the accompanying claims.

For example, in the above embodiment, in order to accurately perform cutting operation on a required portion of a continuously delivered food (F), the arrangement is adopted such that the whole shutter mechanism (1) moves, by means of the cam (4) and driven rod (5), to the delivery direction of the food (F) and further the upstream end portion (U) of the conveyor (3) moves synchronously with the movement of the shutter mechanism (1). However, this invention is not limited to this arrangement. It does not matter whether the delivery operation of the food (the extrduing operation of the food by the nozzle) temporarily halts at the time of cutting the food. In this case, it does without moving back and forth the shutter mechanism (1) and the upstream end portion (U) in accordance with the movement of the food (F), so that it requires only the back-and-forth movement of the downstream end portion (D) of the take-in conveyor (2) by means of the pneumatic cylinder (7), with the result that it can simplify the structure of the apparatus, due to the riddance of its cam and driven rod.

Figure 10:
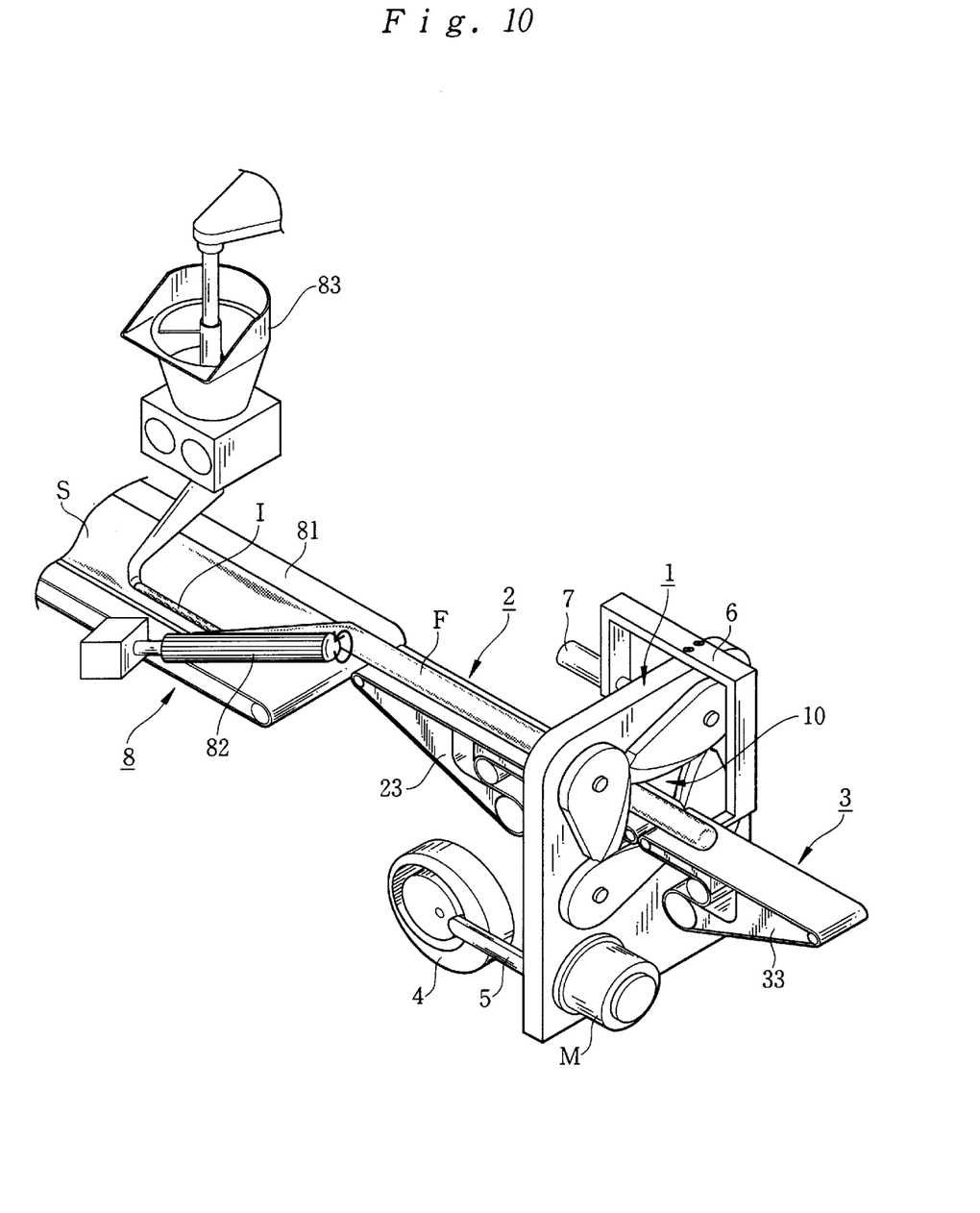
FIG. 10 is a schematic perspective view of the apparatus embodied in the present invention showing one of its modifications.

Also, in the above embodiment, an example is shown where cutting operation is performed on a bar-shaped food (F) formed by continuously extruding a food material from the nozzle (N), but one modification is shown in FIG. 10, wherein such operation is performed on a bar-shaped food wound up by a well-known side winder (8) adapted on the upstream side of the conveyor (2). This side winder winds up the side surface of a sheetlike dough (S), which is continuously delivered from a forming conveyor (81), to the cross-sheet direction by revolving an inclined roller (82) which is diagonally disposed with regard to the carriage direction of the conveyor (81), thereby, which can continuously form a bar-shaped food without doing damage on the glutinous substance contained in a bread dough and the like. The adoption of such winder enables a high-quality cored lump food to be produced. The reference number (83), which is shown in FIG. 10, indicates an extruder to push out an inner material (I) in bar shape onto the dough (S). As such, cutting operation is also performed on a multilayered bar-shaped food formed by concentrically overlaying one food material on another by means of such winder.

Figure 11:
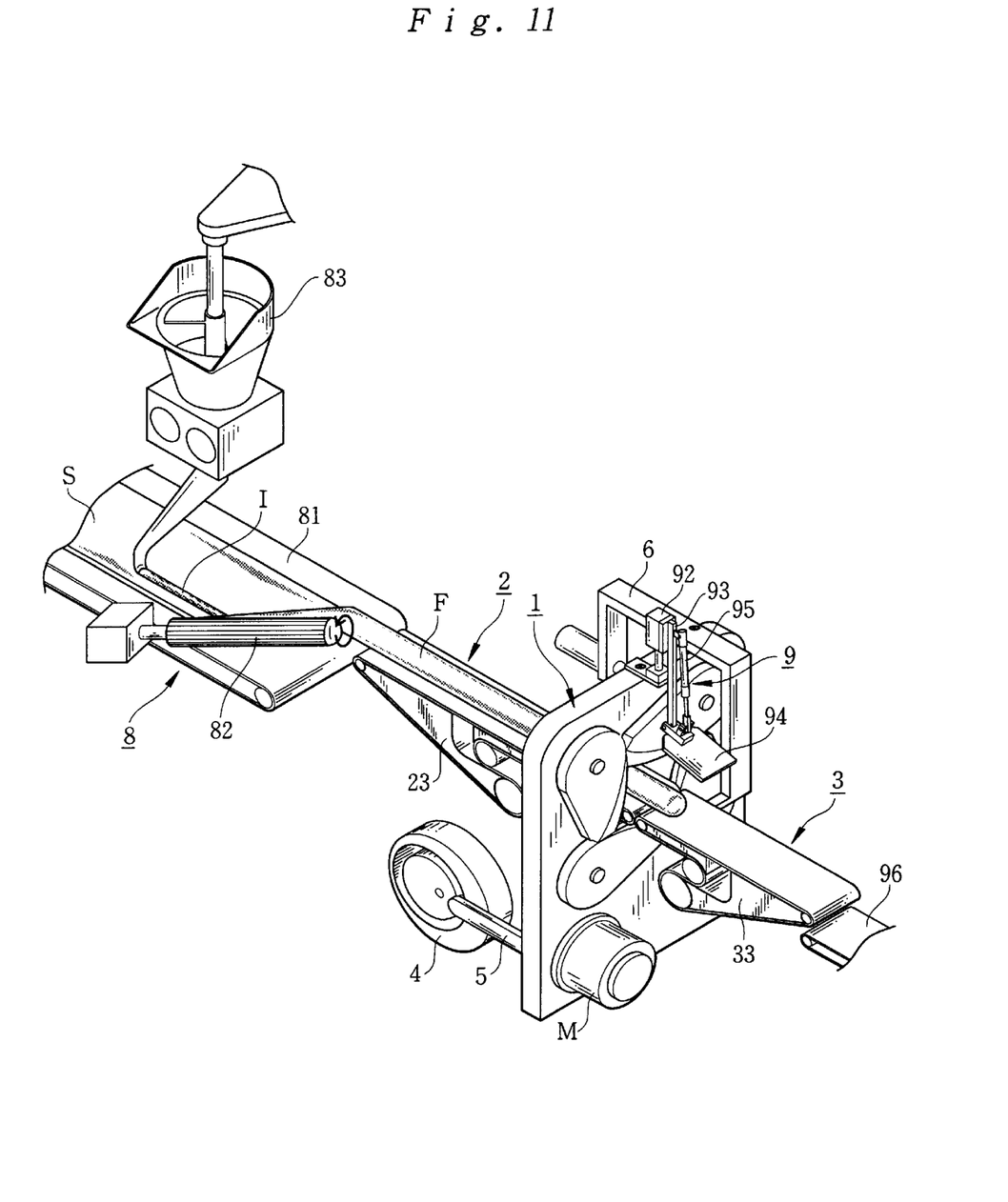
FIG. 11 is a schematic perspective view of the apparatus embodied in the present invention showing another modification thereof.
Figure 12:
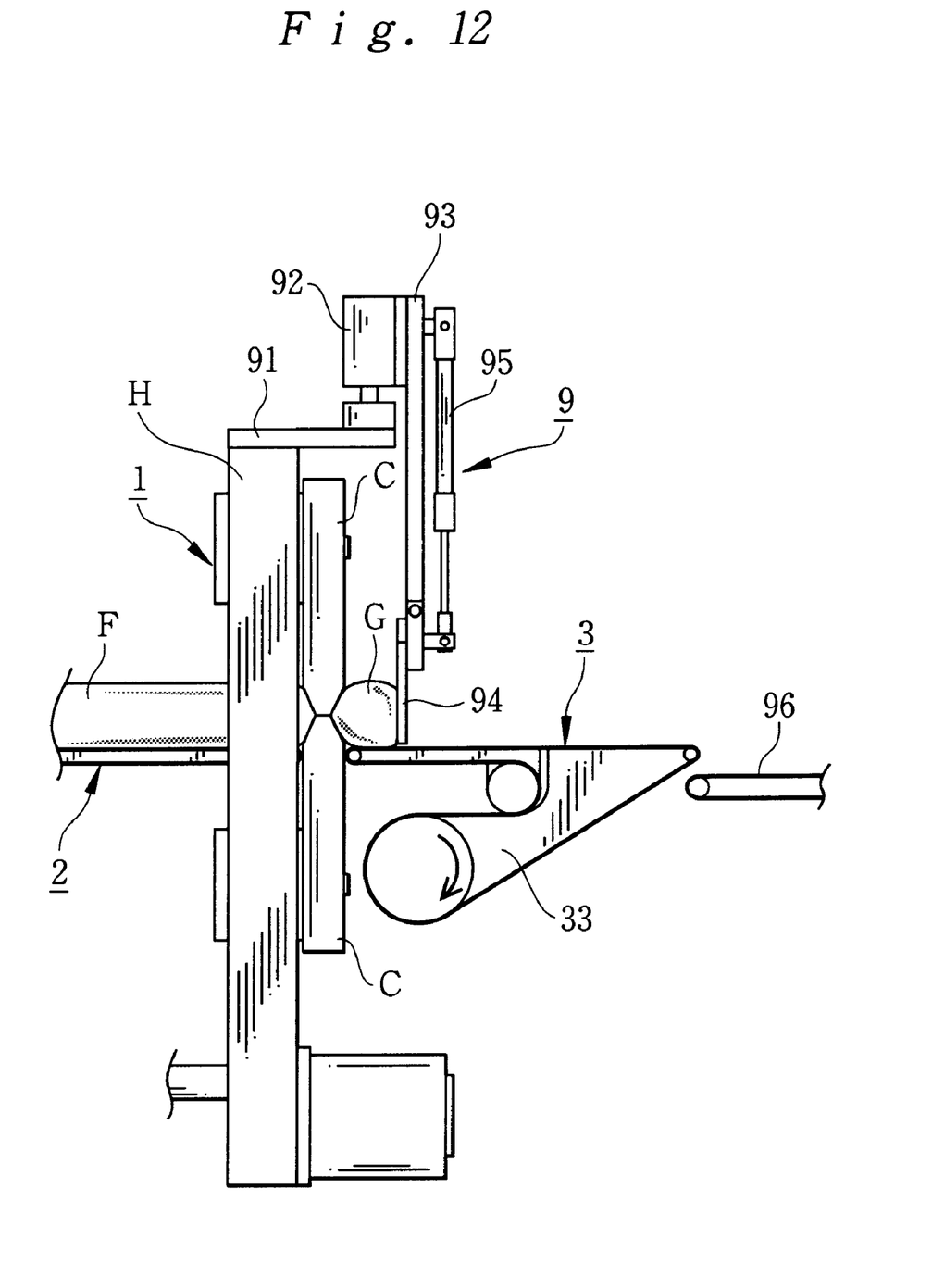
FIGS. 12 and 13 are partly frontal views showing the motion of an auxiliary plate to be incorporated into the present apparatus.
Figure 13:
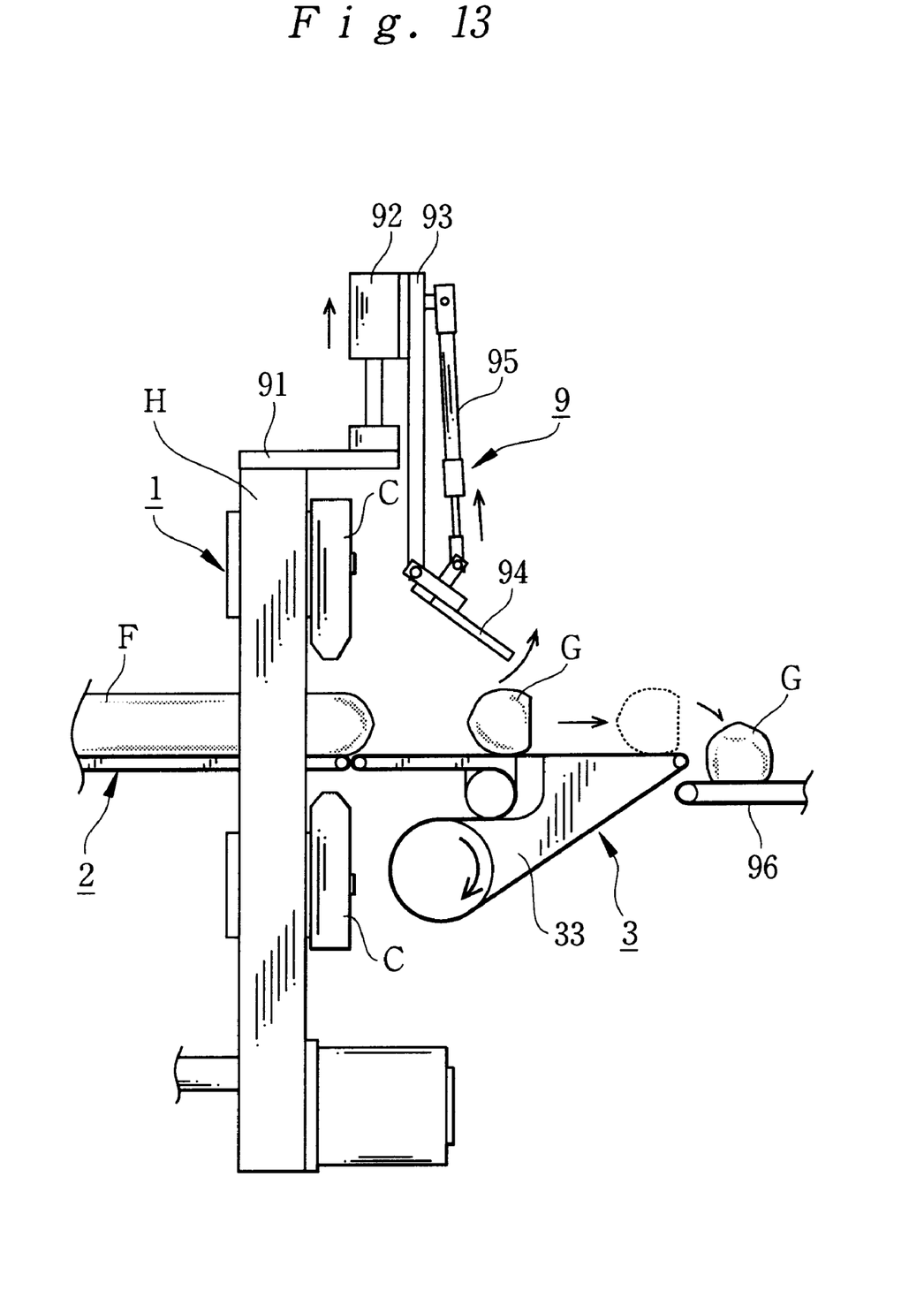

Further, as another modification, FIG. 11 shows cutting operation on the bar-shaped food supported by a cutting auxialiary means (9) which is adapted in the vicinity of the take-out conveyor (3) and provided with a plate (94) retractable from the food take-out course of the conveyor (3). This means, as shown in FIGS. 12 and 13, comprises a first pneumatic cylinder (92) disposed on the upper part of the housing (H) through a stay (91), a bar member (93) moving up and down in accordance with the elongation and contraction of said cylinder, a plate (94) axially supported on the bottom portion of said bar member and a second pneumatic cylinder (95) which is axially supported on the upper part of said bar member and swings up and down said plate by its own elongation and contraction. FIG. 12 shows this plate blocking the tip end of the bar-shaped food on which cutting operation is being performed. In this manner, the shaping operation of a lump food (G) is performed together with the cutting operation. FIG. 13 shows said plate (94) retreating from the food take-out course of the conveyor (3) in accordance with the elongation and contraction of said cylinders (92) and (95) respectively. The cut lump food (G) is further carried on the conveyor (3), which turns by about 90° on a sunken conveyor (96) to be issued out to a destination.

Figure 14:
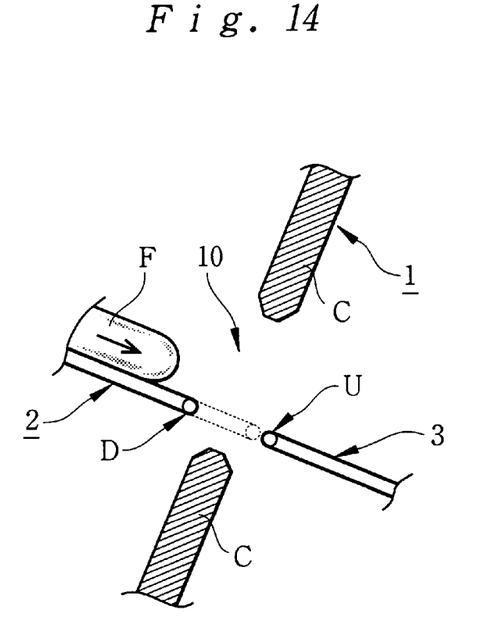
FIGS. 14 and 15 are partly frontal views of the apparatus embodied in the present invention showing further modifications thereof.
Figure 15:
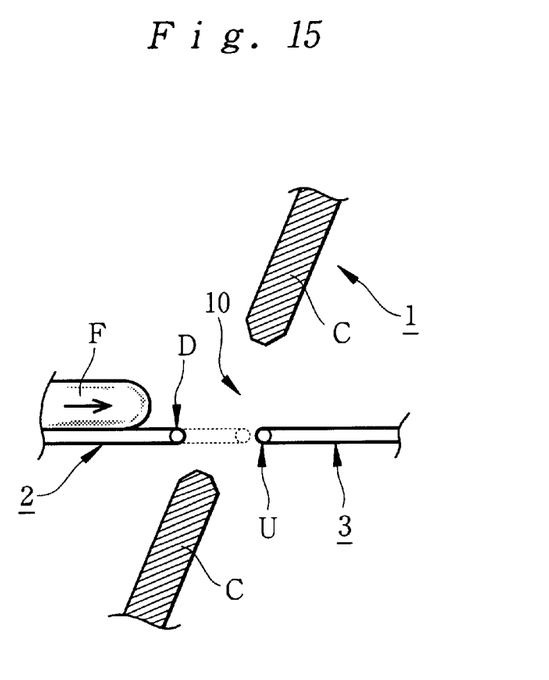

Moreover, in the above embodiment, cutting operation is performed on a bar-shaped food, which is carried by the take-in conveyor (2) horizontally disposed, at the area (10) which is vertically disposed in the cross-machine direction and comprises a plurality of cutters (C) arranged in a vertical plane, but the present invention is not limited to this arrangement. For example, the conveyor (2) can be disposed diagonally as shown in FIG. 14, provided that a bar-shaped food can be delivered with its lying position intact or without succumbing to its self-weight. Further, the angle that the conveyor (2) and the area (10) of the shutter mechanism (1) make on the level surface is not limited to rectangle. For example, FIG. 15 shows a bar-shaped food delivered by the conveyor (2), which is horizontally disposed, cut at an area (10) which comprises a plurality of cutters (C) arranged in an inclined position. Also, a bar-shaped food delivered by the conveyor (2), which is disposed diagonally, can be cut at an area (10) which comprises a plurality of cutters arranged in a horizontal position.

Furthermore, the shutter mechanism (1) provided with an area (10) opening and closing with regard to a bar-shaped food, which comprises a plurality of reciprocally rotatable cutters (C), is adopted in the above embodiment, but the present invention is not limited to this arrangement.

For instance, a well-known shutter mechanism provided with an area opening and closing with regard to a bar-shaped food, which comprises a plurality of polygonal sliding cutters, can be adopted instead. Also, in the above embodiment, the belt portion (27) of the conveyor (2) which is flat in section is adopted, but a gutterlike belt can be also used instead, which can improve the stability of a bar-shaped food lying on the conveyor.

As described above, with a method for cutting a lying bar-shaped food and the same apparatus according to the present invention, cutting operation is performed on a bar-shaped food, which is mounted on the take-in conveyor and delivered to the shutter mechanism, with supported on both take-in and take-out conveyors, so that there is no case where such food is significantly elongated or torn off due to its self-weight during the extruding operation as in the case of the prior apparatus so as to be able to properly cut a predetermined portion of the food without being interrupted with any one of those processing troubles, which leads to the efficient production of a high-quality lump food.

As mentioned above, the method for cutting a lying bar-shaped food and the same apparatus according to the present invention are extremely useful in view of its applicability, as it enables a required portion of a bar-shaped food made from any kind of materials to be cut without being interrupted with such troubles as the elongation or tear-off thereof as well as a bar-shaped food to be formed without doing damage on the glutinous substance of bread dough and the like and a required portion thereof to be cut without being interrupted with such troubles as the elongation or tear-off thereof.

What is claimed is:

1. A method for cutting a lying bar-shaped food wherein the bar-shaped food (F) is introduced into a cutting area (10) of a shutter mechanism (1), said area being enclosed with a plurality of cutter pieces (C), and a predetermined portion of said food (F) is cut by closing said area, said method comprising the steps of:
transferring at least a tip end portion of said food (F) from a downstream end portion (D) of a take-in conveyor (2) to an upstream end portion (U) of a take-out conveyor (3) by delivering said food towards said cutting area (10) with said food mounted on the take-in conveyor (2) while inserting the downstream end portion (D) into the area (10) in an open position so that it approaches to said end portion (U) of the take-out conveyor (3);
retreating the downstream end portion (D) from the area (10) by retracting the downstream end portion (D) with the tip end portion of the food (F) mounted on the take-out conveyor (3);
and cutting a predetermined portion of the food (F) by closing the area by means of the operation of the cutter pieces (C) so as to form a cut food (G), said cut food (G) being issued out by said take-out conveyor (3).

2. The method according to claim 1 wherein the shutter mechanism (1), the downstream end portion (D) of the take-in conveyor (2) and the upstream end portion (U) of the conveyor (3) synchronize with the carriage operation of the food (F) by means of the conveyor (2) so as to simultaneously move to a delivery direction of said food.

3. An apparatus for cutting a lying bar-shaped food wherein the bar-shaped food (F) is introduced into a cutting area (10) of a shutter mechanism (1), said area being enclosed with a plurality of cutter pieces (C), and a predetermined portion of said food (F) is cut by closing said area, said apparatus comprising:

a take-in conveyor (2) disposed in the vicinity of the cutting area (10), said conveyor (2) delivering the food (F) with the latter mounted thereon towards the cutting area (10) while reciprocally moving back and forth between an advance position where a downstream end portion (D) of the conveyor (2) is inserted into said area in an open position and a retract position where said end portion (D) is retreated from said area (10);

a take-out conveyor (3) disposed in the vicinity of the cutting area (10) and as opposed to said conveyor (2), said conveyor (3) receiving a tip end portion of the food (F) from the downstream end portion (D) of the conveyor (2) in an advance position where said end portion (D) is inserted into the area (10) and issuing out a cut food (G) formed by the closing operation of the area (10).

4. The apparatus according to claim 3 wherein the shutter mechanism (1), the downstream end portion (D) of the conveyor (2) and the upstream end portion (U) of the conveyor (3) synchronize with the carriage operation of the food (F) by means of the conveyor (2) so as to simultaneously move to a delivery direction of said food.

5. The apparatus according to claim 3 wherein on an upstream side of the conveyor (2) a side winder means (8) is disposed, said means continuously forming a bar-shaped food (F) by winding up the side surface of a sheetlike dough (S), which is continuously delivered by a forming conveyor (81), to a cross-apparatus direction with an inclined roller (82).

6. The apparatus according to claim 3 wherein the take-in conveyor (2) comprises a fixed frame (23) which axially supports a drive pulley (21) and an upstream end pulley (22), a movable table (26) which axially supports a downstream end pulley (24) and an intermediate pulley (25), said table (26) approaching to and moving away from said fixed frame (23), and a belt portion (27) wound on said pulleys (21), (22) and (24) with its outer side surface facing up while wound on said intermediate pulley (25) with its inner side surface facing up.

7. The apparatus according to claim 4 wherein on an upstream side of the conveyor (2) a side winder means (8) is disposed, said means continuously forming a bar-shaped food (F) by winding up the side surface of a sheetlike dough (S), which is continuously delivered by a forming conveyor (81), to a cross-apparatus direction with an inclined roller (82).

8. The apparatus according to claim 4 wherein the take in conveyor (2) comprises a fixed frame (23) which axially supports a drive pulley (21) and an upstream end pulley (22), a movable table (26) which axially supports a downstream end pulley (24) and an intermediate pulley (25), said table (26) approaching to and moving away from said fixed frame (23), and a belt portion (27) would on said pulleys (21), (22) and (24) with its outer side surface facing up while wound on said intermediate pulley (25) with its inner side surface facing up.

9. The apparatus according to claim 6 wherein on an upstream side of the conveyor (2) a side winder means (8)

is disposed, said means continuously forming a bar-shaped food (F) by winding up the side surface of a sheetlike dough (S), which is continuously delivered by a forming conveyor (81), to a cross-apparatus direction with an inclined roller (82).

10. The apparatus according to claim 8 wherein on an upstream side of the conveyor (2) a side winder means (8) is disposed, said means continuously forming a bar-shaped food (F) by winding up the side surface of a sheetlike dough (S), which is continuously delivered by a forming conveyor (81), to a cross-apparatus direction with an inclined roller (82).

* * * * *